(12) United States Patent
Fernandes et al.

(10) Patent No.: US 12,299,489 B2
(45) Date of Patent: May 13, 2025

(54) AUTOMATIC DEPENDENCY CONFIGURATION FOR MANAGED SERVICES

(71) Applicant: RED HAT, INC., Raleigh, NC (US)

(72) Inventors: Ricardo Zanini Fernandes, São Paulo (BR); Vaibhav Jain, Meerut (IN)

(73) Assignee: Red Hat, Inc., Raleigh, NC (US)

( * ) Notice: Subject to any disclaimer, the term of this patent is extended or adjusted under 35 U.S.C. 154(b) by 668 days.

(21) Appl. No.: 17/338,493

(22) Filed: Jun. 3, 2021

(65) Prior Publication Data
US 2022/0391255 A1    Dec. 8, 2022

(51) Int. Cl.
*G06F 9/50*  (2006.01)
*G06F 9/445*  (2018.01)
*G06F 9/455*  (2018.01)
*G06F 9/52*  (2006.01)
*G06F 11/30*  (2006.01)

(52) U.S. Cl.
CPC ........ *G06F 9/5022* (2013.01); *G06F 9/44505* (2013.01); *G06F 9/455* (2013.01); *G06F 9/45558* (2013.01); *G06F 9/50* (2013.01); *G06F 9/5005* (2013.01); *G06F 9/5061* (2013.01); *G06F 9/5077* (2013.01); *G06F 9/52* (2013.01); *G06F 11/30* (2013.01); *G06F 2009/45562* (2013.01); *G06F 2009/4557* (2013.01); *G06F 2209/521* (2013.01)

(58) Field of Classification Search
CPC ................ G06F 9/455; G06F 9/45558; G06F 2009/45562; G06F 2009/4557; G06F 9/50; G06F 9/5005; G06F 9/5016; G06F 9/5022; G06F 9/5061; G06F 9/5077; G06F 11/30
See application file for complete search history.

(56) References Cited

U.S. PATENT DOCUMENTS

| 9,009,521 B2 | 4/2015 | Jaisinghani |
| 11,860,743 B1 * | 1/2024 | Willett ................ G06F 9/45533 |
| 2011/0231452 A1 * | 9/2011 | Nakajima ........... G06F 11/1469 |
| | | 707/E17.005 |

(Continued)

FOREIGN PATENT DOCUMENTS

| CN | 111930466 A | 11/2020 |
| CN | 112000343 A | 11/2020 |

(Continued)

OTHER PUBLICATIONS

Toffetti, G. (Apr. 21, 2015). "An Architecture for Self-Managing Microservices," InIT Cloud Computing Lab Zurich University of Applied Sciences, Zurich, Switzerland, pp. 6.

(Continued)

*Primary Examiner* — Charles M Swift
(74) *Attorney, Agent, or Firm* — Womble Bond Dickinson (US) LLP

(57) ABSTRACT

A container-orchestration system reads specification data associated with a third-party resource used by a managed resource. Based on the specification data the system retrieves resource configuration data of the third-party resource and updates a dependency definition with the resource configuration data. The dependency definition is associated with the managed resource and the third-party resource. The system provides the dependency definition to the managed resource.

20 Claims, 5 Drawing Sheets

(56) References Cited

U.S. PATENT DOCUMENTS

| | | | |
|---|---|---|---|
| 2015/0040125 A1* | 2/2015 | Anderson | G06F 9/45558 |
| | | | 718/1 |
| 2018/0136931 A1* | 5/2018 | Hendrich | G06F 11/30 |
| 2021/0048995 A1* | 2/2021 | Myers | G06F 11/1469 |
| 2021/0049002 A1* | 2/2021 | Myers | G06F 8/656 |
| 2021/0132976 A1* | 5/2021 | Chandrappa | G06F 9/45558 |

FOREIGN PATENT DOCUMENTS

| | | |
|---|---|---|
| CN | 112000434 A | 11/2020 |
| CN | 112350855 A | 2/2021 |
| WO | 2021017301 A1 | 2/2021 |

OTHER PUBLICATIONS

Chang, C. (2017). "A Kubernetes-Based Monitoring Platform for Dynamic Cloud Resource Provisioning," IEEE, pp. 6.

\* cited by examiner

AUTOMATIC DEPENDENCY CONFIGURATION FOR MANAGED SERVICES

TECHNICAL FIELD

Aspects of the present disclosure relate to container-orchestration systems, and more particularly, to the deployment of managed services.

BACKGROUND

A container-orchestration system may automate many of the manual processes involved in deploying, managing, and scaling containerized applications. For example, a container-orchestration system for developing and running containerized applications may allow applications and the data centers that support them to expand from just a few machines and applications to thousands of machines that serve millions of clients. Container-orchestration systems may provide an image-based deployment module for creating containers and may store one or more image files for creating container instances. Many application instances can be running in containers on a single host without visibility into each other's processes, files, network, and so on. Each container may provide a single function (often called a "service") or component of an application, such as a web server or a database. These services may be connected to various resources and managed by a system operator.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
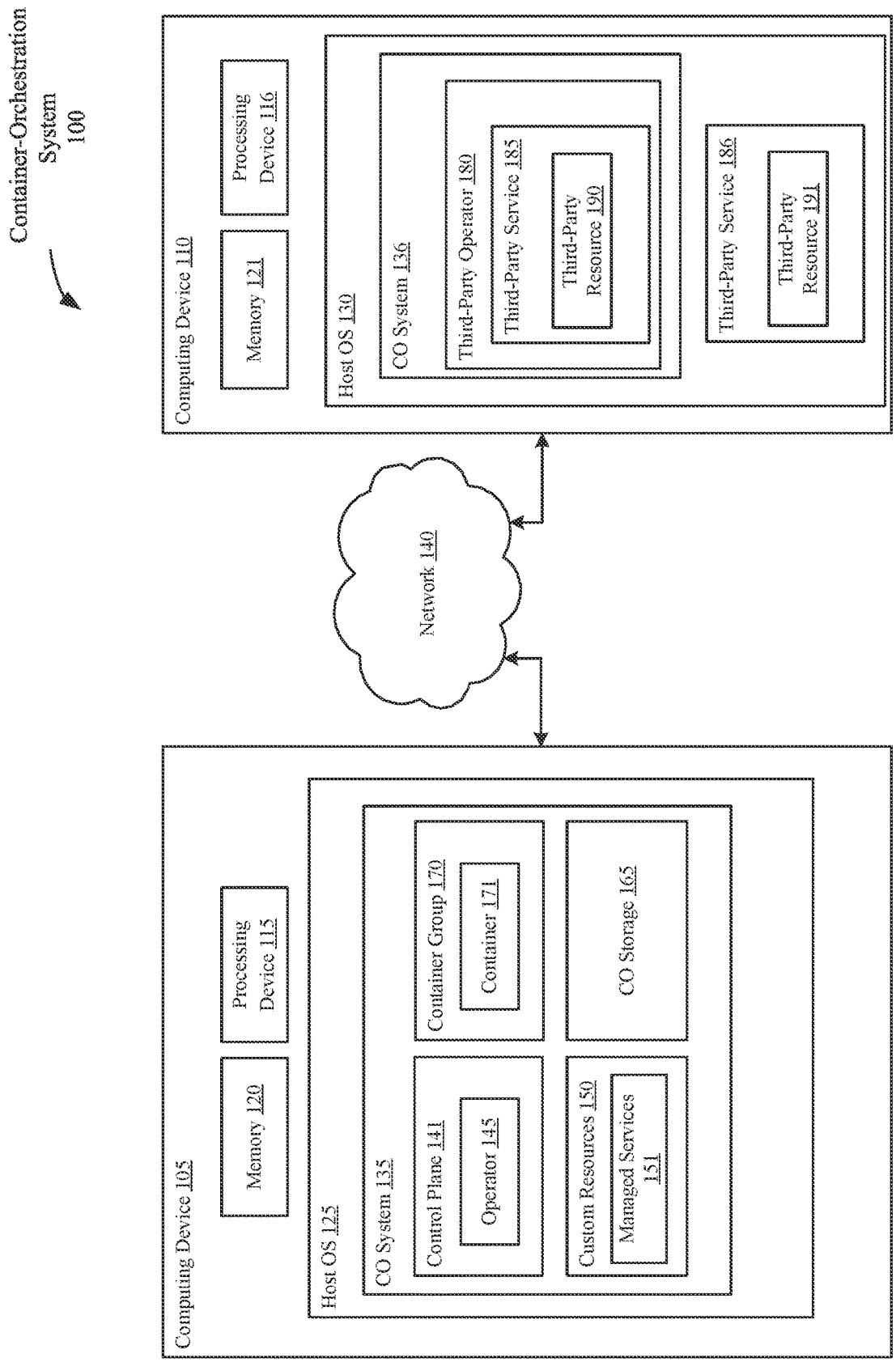
FIG. 1 is a block diagram that illustrates an example of a container-orchestration system.

Custom services, such as a containerized application for example, are deployed within a node or group of nodes (hereinafter, "cluster") of a container-orchestration system (e.g., Redhat™ OpenShift™ module on a Kubernetes® platform) may depend on other services and their respective resources deployed within and outside the group. For example, a web service may persist its data into a resource, such as a database. The services may be deployed and connected to other services and resources by a cluster's system operator through a dependency configuration. These services and resources may be local to the operator, meaning already managed by the operator deploying the service, or may not be local and is a third-party resource managed by another operator. It is inefficient and costly when a service needs to be configured to use a third-party resource that may be located within or outside the cluster. The options to implement a dependency configuration of a third-party resource through its API (application programming interface) can be complicated, difficult to deploy, cause errors and downtime, and may include human intervention to manually configure the deployed service to connect to the third-party resource based. The level of intervention is compounded when a third-party service's operator changes its API or configuration, sometimes without notice to its connections, which may result in a variety of failures, downtime and ultimately a manual reconfiguration of the managed service to accommodate the changes.

Aspects of the present disclosure remedy the above and other deficiencies by utilizing automatic dependency configuration for managed services. In embodiments, a container-orchestration system may receive specification data associated with a third-party resource. The container-orchestration system may connect to the third-party resource to retrieve the resource configuration data of the third-party resource, and update the specification data with the resource configuration data to create a dependency definition associated with the third-party resource. The dependency definition may be provided to managed resources managed by an operator of the container-orchestration system and used for deployment of containers and their resources, such as applications. The third-party resource may be accessed by any of the managed services managed by the operator of the container-orchestration system without having to connect each requesting service separately, and without having to connect through the third-party API.

In an embodiment, the operator of the container-orchestration system updates the specification data by translating the resource configuration data into objects that may be readable by services managed within one or more clusters of the container-orchestration system. This assures the managed service's independence with its dependencies since the configuration is translated into core objects of the container-orchestration system. As such, the service consuming the third-party resource is not aware of the third-party implementation and operates as if consuming a local resource.

The container-orchestration system container deployment efficiency is increased while downtime during manual configurations and failures based on third-party changes is reduced when the container-orchestration system is configured to create and maintain dependency definitions that automatically connects a managed service to a third-party service. A managed service may have multiple dependency definitions based on resource configuration data that is translated into container-orchestration objects readable by the managed service. As a result, the dependency can be changed at any time, without manual intervention to reconfigure the service, which further increases the efficiency of the container-orchestration system and decreases manual intervention that may induce system errors.

FIG. 1 depicts a high-level component diagram of an illustrative example of a container-orchestration system 100, in accordance with one or more aspects of the present disclosure. One skilled in the art will appreciate that other architectures for a container-orchestration system 100 are possible, and that the implementation of a computer system utilizing examples of the invention are not necessarily limited to the specific architecture depicted by FIG. 1.

FIG. 1 is a block diagram that illustrates an example of a container-orchestration system 100, in accordance with one or more aspects of the present disclosure. The container-orchestration system 100 may include a computing device 105 and computing device 110. For simplicity, only two computing devices are illustrated, however, there may be more or less implemented in other embodiments of the container-orchestration system 100. The computing devices 105, and 110 may be coupled to each other (e.g., may be operatively coupled, communicatively coupled, may communicate data/messages with each other) over network 140. Network 140 may be a public network (e.g., the internet), a private network (e.g., a local area network (LAN) or wide area network (WAN)), or a combination thereof. In various embodiments, the network 140 may include a wired or a wireless infrastructure, such as a WiFi' hotspot connected with the network 140, and/or a wireless carrier system that can be implemented using various data processing equipment, communication towers (e.g. cell towers), etc. In embodiments, the network 140 may utilize any protocol or combination of protocols for communicating between the computing devices 105 and 110, such as Ethernet, internet protocol (IP), etc.

Each computing device 105 and 110 may include hardware such as processing device 115 and 116, memory 120 and 121, respectively, and other hardware devices (e.g., sound card, video card, etc.) (not shown). The processing device 115 and 116, and the memory 120 and 121 may be any one or combination of processing devices and memories discussed below with respect to FIG. 4 and FIG. 5. In an illustrative example, processing device 115 or processing device 116 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 115 or processing device 116 may also include one or more special-purpose processing devices such as an application specific integrated circuit (ASIC), a field programmable gate array (FPGA), a digital signal processor (DSP), network processor, or the like.

Each computing device 105 and 110 may include any suitable type of computing device or machine that has one or more processing devices (e.g., processing device 115) including, for example, server computers, desktop computers, laptop computers, tablet computers, smartphones, set-top boxes, etc. In some examples, each of the computing devices 105, and 110 may comprise a single machine, virtual machines running on one or more machines, or may include multiple interconnected real or virtual machines (e.g., multiple nodes in a cluster). The computing devices 105 and 110 may be implemented by a common entity or may be implemented by different entities. For example, computing device 105 may be operated by a first entity and one or more computing device 110 may be operated by a second entity.

In one embodiment, the computing devices 105 and 110 include an operating system (OS), such as host OS 125 and host OS 130, respectively. The host OS 125 and 130 of a computing device 105 and 110 may manage the execution of other components (e.g., software, applications, etc.) and may manage access to hardware (e.g., processors, memory, storage devices etc.) of its respective computing device. In embodiments, computing device 105 may implement a container-orchestration system 135 (CO system 135) that includes a control plane 141, custom resources 150, container-orchestration storage 165 (CO storage 165) and a container group 170. Computing device 110 may implement a container-orchestration system 136 (CO system 136) that is connected to and in communication with CO system 135 of computing device 105, such as through the network 140. In embodiments, CO system 136 may be logically or functionally the same container-orchestration system as CO system 135, have a client relationship with CO system 135, or a self-contained container-orchestration system and able to communicate and interoperate with CO system 135.

CO system 136 may include a third-party operator 180 and a third-party service 185 that is connected to third-party resource 190. In embodiments, the third-party resource 190 may be on computing device 110 or located on another computing device (not shown) either locally or remotely through the network 140. The host OS 130 may also include a third-party service 186 and its third-party resource 191 managed by an external third-party operator (not shown) that are not operating within the CO system 136, but are still accessible by the CO system 135 and CO system 136.

In one embodiment, the CO system 135 and executes on the host OS 125 of computing device 105 and the host OS 130 of computing device 110, respectively. The CO system 135 may be a system for developing, deploying and running containerized applications that, for example, may include or be in communication with services and resources. For example, a service may utilize connections to one or more resources, such as a database, a message broker, or another piece of infrastructure within the CO system 135, CO system 136, computing device 110, or another computing device (not shown) within, or in communication with, the container-orchestration system 100.

The CO system 135 may include one or more basic compute-units such as container group 170 that runs on a node (e.g., CO system 135 on computing device 105). A node may be a virtual or physical machine, depending on the cluster, as discussed above. Each node is managed by a control plane, such as the control plane 141, and contains the services necessary to run a container group, such as container group 170. The container group 170 may include, for example, one or more containers, such as container 171, which may be deployed on a single host. Each container may include, for example, applications, which consist of application code and everything the code requires to run properly. The container 171 is defined, deployed, and managed by the CO system 135, and specifically, in an embodiment, by the operator 145.

Custom services, such as an application running within container 171, may depend on other services deployed within CO system 135 or CO system 136. For example, a web service (application) may be required to persist its data into a database resource. To connect to a third-party resource, in an embodiment, the operator 145 may use one or more custom resources of custom resources 150 to retrieve specification data of a dependency definition (not shown) associated with the third-party service 185 and its third-party resource 190 from storage, such as CO storage 165. The operator 145 may create, if new, or update dependency definition associated with the custom resources 150 to describe, for example, the third-party resource 190 of the third-party service 185 that a managed service from managed services (not shown) associated with the container 171 uses to properly execute. As a result, the dependency definition can be changed to reflect changes to the third-party service and resource (e.g., third-party service 185 and third-party resource 190 or third-party service 186 and third-party resource 191) without manual intervention, such as user constructed scripts, to reconfigure the managed service.

Figure 2:
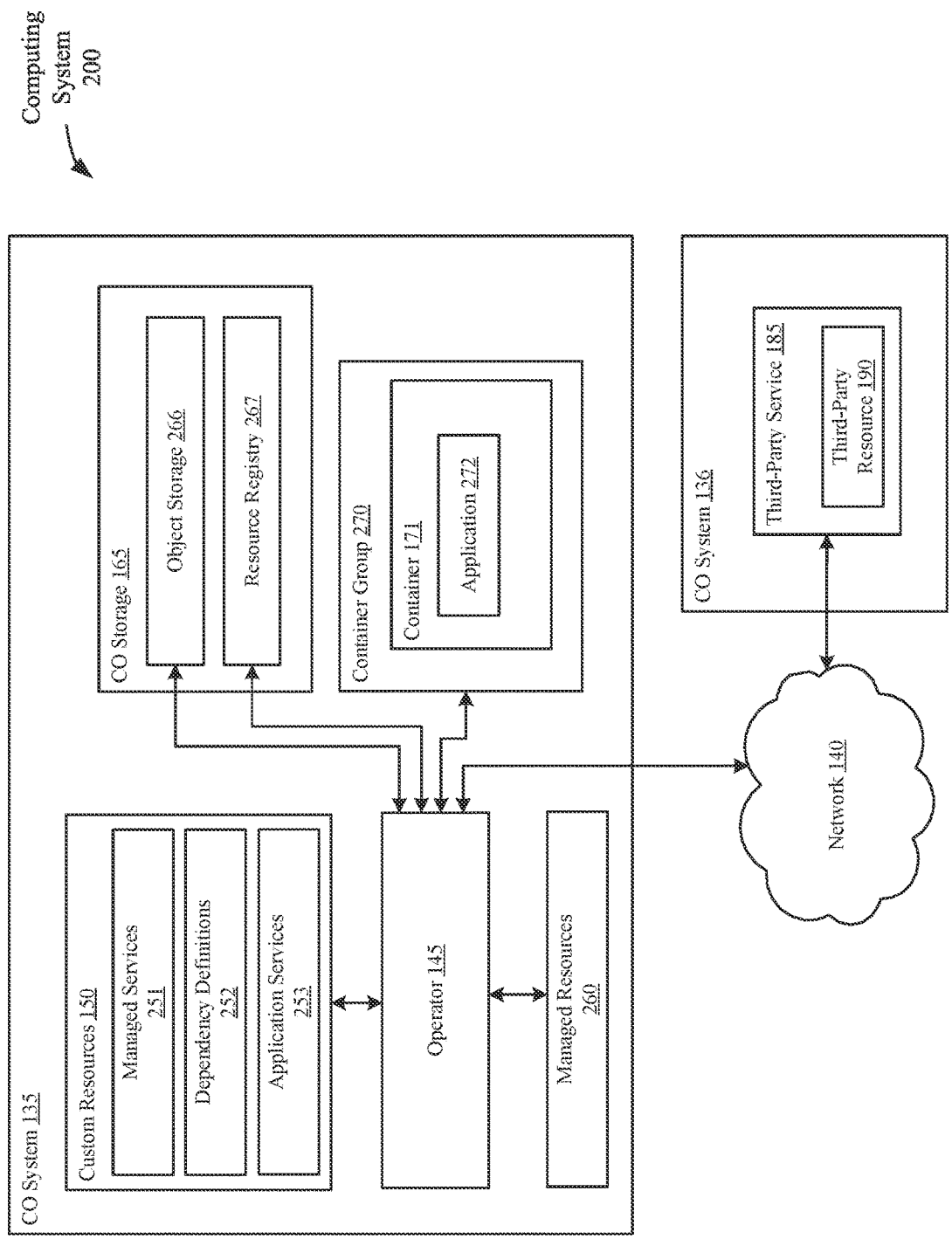
FIG. 2 is a block diagram that illustrates an example of a computing system for connecting a container-orchestration system connectable to third-party services.

FIG. 2 is a block diagram that illustrates an example of a computing system 200 for connecting a container-orchestration system connectable to third-party services. Computing system 200 may include one or more computing devices such as those described with respect to FIG. 1 (e.g., computing devices 105 and 110). For simplicity and clarity, operating systems and other system components are not shown in FIG. 2 (e.g., host OS 125, processing device 115, etc.). As illustrated here, computing system 200 includes a container-orchestration (CO) system 135, a container-orchestration (CO) system 136 and a network 140 to connect them. CO system 135 includes an operator 145, custom resources 150, managed resources 260, CO storage 165, and a container group 170.

Custom resources 150 may include, for example, managed services 251, dependency definitions 252 and an application services 253. In an embodiment, the managed services 251 defines specialized services managed by the operator 145, and the dependency definitions 252 describes custom resources from a local service (e.g., managed by the operator 145) or a third-party service that one or more managed services (e.g., container 171) depends on to function. For example, third-party resource 190 of third-party service 185 may be needed for container 171, that is managed by the operator 145, to function, and is described in the dependency definitions 252. In an embodiment, the dependency definitions 252 may include specification data or other resource data about local services or third-party services, such as third-party service 185, which may be within the CO system 135 or external to the CO system 135. In embodiments, each dependency definition within dependency definitions 252 is a separate file or logically partitioned within a single file to separate each dependency.

In an embodiment, the operator 145 may receive a notification a change of configuration of the third-party resource and read the specification data provided by a dependency definition (not shown) of the dependency definitions 252 for the third-party resource 190 of the third-party service 185. For example, the operator 145, based on reading the specification data, retrieves resource configuration data for the third-party resource from the resource registry 267 in the CO storage 165. The operator 145 updates a corresponding dependency of the dependency definitions 252 associated with the third-party service 185 with the retrieved resource configuration data. In embodiments, the configuration data includes properties associated with the third-party dependency. For example, the update may include updating, creating, or inserting property data into fields within a dependency within the dependency definitions 252 that may be used by any managed service (e.g., within managed services 251), to connect to and use the third-party service 185 and third-party resource 190.

Once the dependency definitions 252 is updated for the third-party resource 190 of the third-party service 185, the operator 145 may translate all or some of the resource configuration data into container-orchestration objects, or object data, that are readable by any service within the CO system 135 or CO system 136. In embodiments, some or all of the object data may be stored in and retrieved from the object storage 266, or some or all of the object data may need to be created and subsequently stored in the object storage 266.

In an embodiment, the object data and additional data may be provided (e.g., injected or linked into its configuration) to the managed services 251 for deployment. For example, the operator 145 using the managed resources 260 and the application services 253 may deploy containers that include the third-party custom resource configuration, such as container 171 configured to use third-party resource 190 of the third-party service 185.

Figure 3:
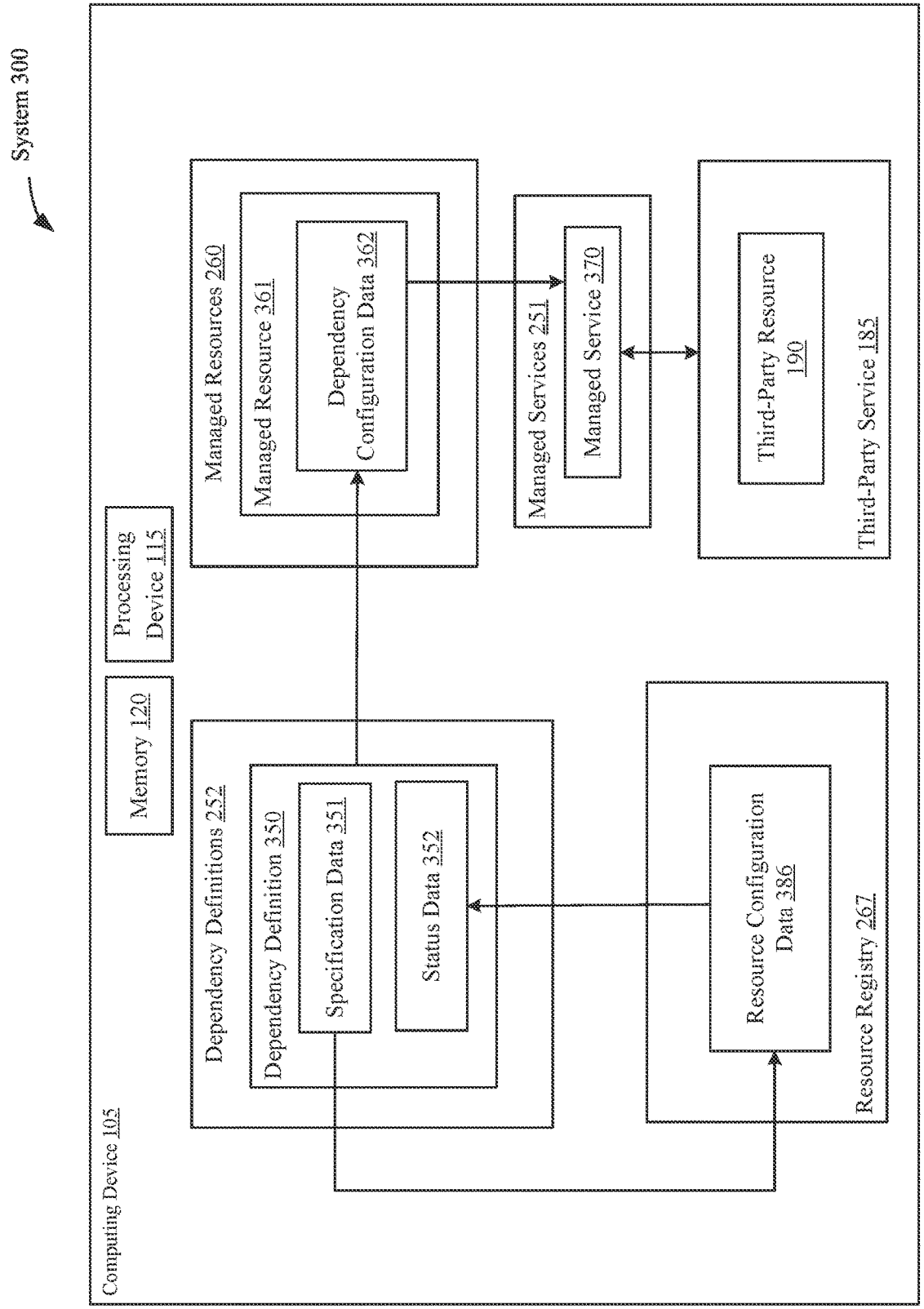
FIG. 3 illustrates a system for automatic dependency configuration for managed services.

FIG. 3 illustrates a system 300 for automatic dependency configuration for managed services. The system 300 illustrates a computing device 105, processing device 115, memory 120, and additional detail with respect to FIG. 2, specifically embodiments of the dependency definitions 252, managed resources 260, container 171, application 272, third-party service 185, and third-party resource 190, according to embodiments. For example, dependency definitions 252 may include specification data 351 and status data 352. Managed resources 260 may include one or more managed resources, such as managed resource 361, which includes dependency configuration data 362. The resource registry 267 may include, resource configuration data 386 associated with, for example, the third-party resource 190 of the third-party service 185. For simplicity, the third-party service 185 is shown within the computing device 105, in other embodiments, as described above with respect to FIG. 1, the third-party service 185 may be on other computing devices locally or remotely (e.g., computing device 106 over network 140). The processing device 115 and the memory 120, in embodiments, may be any one or combination of processing devices and memories discussed above with respect to FIG. 1.

The dependency definitions 252 may include multiple dependencies, such as dependency definition 350. The dependency definition 350 may include one or more fields for data, for example, specification data 351 and status data 352. For convenience, fields are used to describe portions of the data contained therein, however, the data of dependency definition 350, in embodiments, may be organized in any manner such that it may be accessed and utilized by the system 300 to configure dependencies linked to managed resources for deploying managed services.

In an embodiment, the specification data 351 field includes specification data for the third-party resource 190 of the third-party service 185. For example, the specification data 351 may include but is not limited to specification data, such as resource type, name, namespace, API (application programming interface) version, and API group, or other contextual data, such as a configuration map. The operator 145 (not shown) may retrieve resource configuration data 386 associated with resources of the third-party service 185 from the resource registry 267 in the CO storage 165 (see FIG. 2), based on the specification data within specification data 351.

The operator 145 may update the status data 352 of the dependency definition 350 with the resource configuration data 386 associated with the resources (e.g., third-party resource 190) of the third-party service 185. In an embodiment, the status data 352 may be updated by information about the third-party resource corresponding to the current state of the third-party service 185 dependency. For example, the status data 352 may include resource configuration data about the dependency, such as but not limited to, credentials, URIs (uniform resource identifier), volumes, variables, and any other kind of data required by the managed resource 361 to connect to or consume the third-party service 185 and its resources (e.g., third-party resource 190 of FIG. 2). The resource configuration data 386 may also include property data such as a container-orchestration (e.g., CO system 135) service port and DNS (domain name system); confidential information to hold sensitive information from the third-party dependency, such as user information and passwords, and certificates that may be required to connect with the third-party service 185 and its third-party resource 190; and other general configuration data exposed by the dependency may be defined as an environment variable or a configuration map volume mount. In an embodiment, areas of confidential information within the status data 352 may be created to hold resource sensitive information from the dependency, such as user and password for the third-party resource or service (e.g., third-party resource 190), which may be referenced as required in the status data 352.

Similarly, as discussed above with respect to FIG. 2, in embodiments, the operator 145 may translate all or some of the specification data 351 and status data 352 into container-orchestration objects, or object data, that are readable by any service within the system 300. The operator 145 may inject or insert the object data into its managed services. For example, this may be by generating or updating a configuration file or other data file, program location, or link associated with a managed service, such as the managed service 370 of managed services 251. In embodiments, this may include transforming environment variables added to the status data 352 into environment variables for the container-orchestration system (e.g., CO system 135 of FIG. 1) of the managed service, injecting or inserting properties into a configuration map of the managed service. Additionally, volumes (not shown) may be mounted based on the confidential information provided by the resource configuration data 386, other sensitive information, or configuration maps for general properties.

Figure 4:
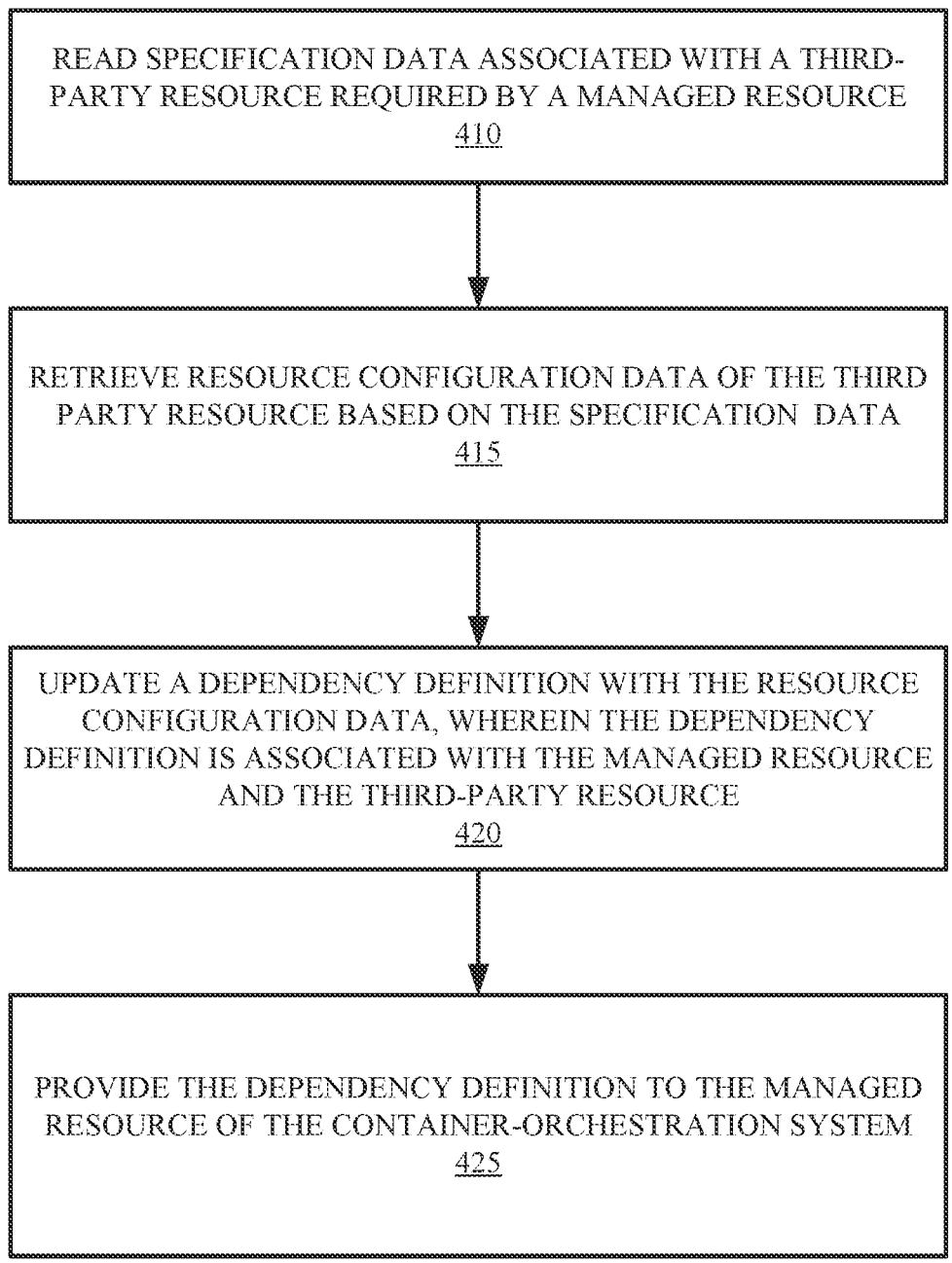
FIG. 4 is a flow diagram of a method to connect a managed service to a third-party service, in accordance with some embodiments.

In an embodiment, object data may be inserted into managed resource 361 as dependency configuration data 362. As a result, a managed service 370 along with the dependency configuration data 362 may be used to deploy and connect containers and their applications (e.g., container 171 and application 272 of FIG. 2) to the third-party service 185. In embodiments, the managed service 370 may have multiple dependency definitions, such as ones associated with a database and a message broker, respectively, whether the dependency is a local resource/service or a third-party resource/service. Because the dependency (e.g., dependency definition 350) is translated into container-orchestration objects the managed service (e.g., managed service 370) has independence with its dependencies and a dependency definition may be used by other managed services. A dependency can be changed at any time, without manual intervention to reconfigure the service FIG. 4 is a flow diagram of a method 400 to connect a managed service to a third-party service, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by operator 145 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410 where the processing logic reads specification data associated with a third-party resource required by a managed resource.

At block 415 the processing logic retrieves resource configuration data of the third-party resource based on the specification data.

At block 420 the processing logic updates a dependency definition with the resource configuration data, wherein the dependency definition is associated with the managed resource and the third-party resource.

At block 425 the processing logic provides the dependency definition to the managed resource of the container-orchestration system.

Figure 5:
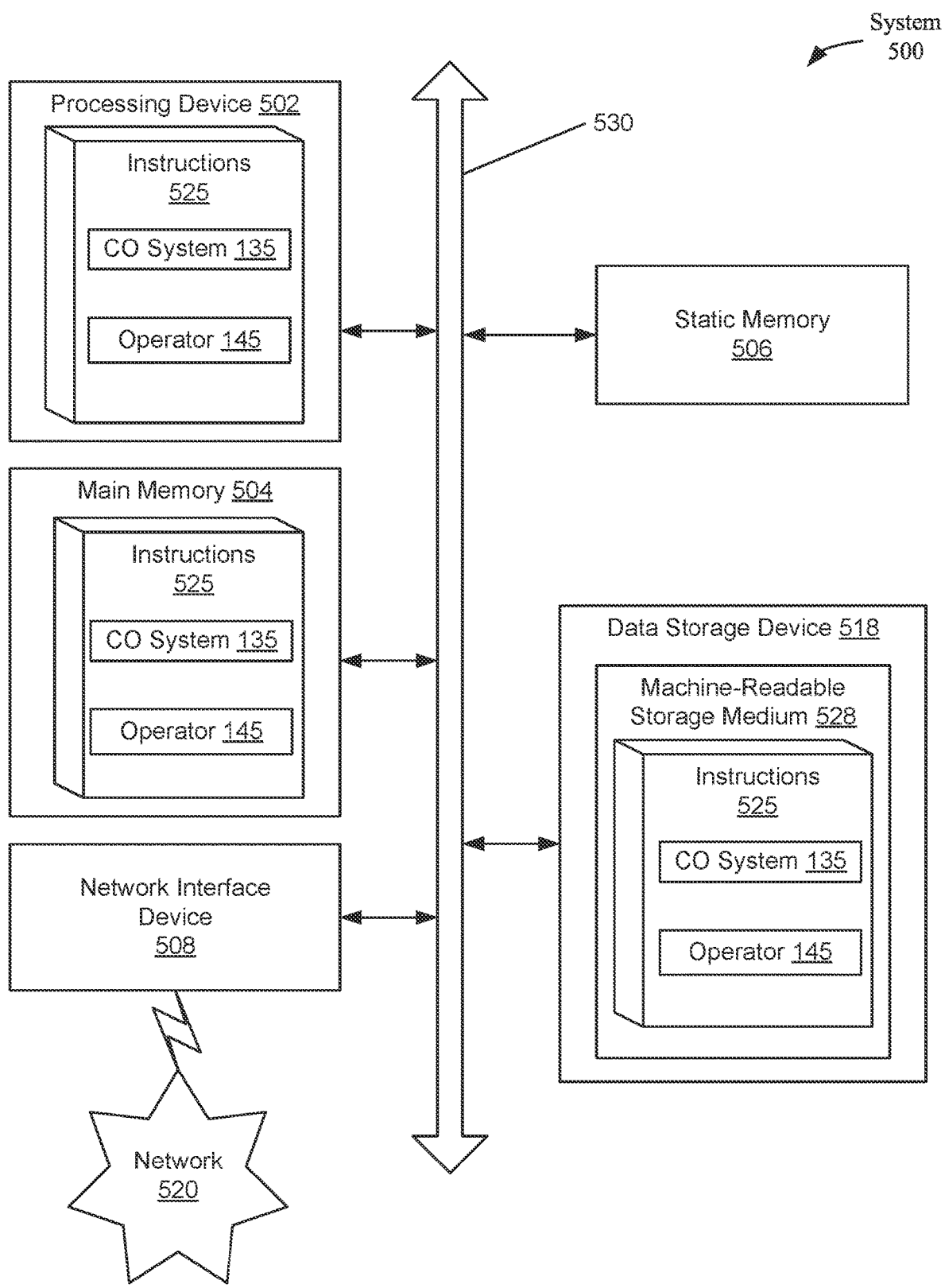
FIG. 5 is a block diagram of an example apparatus that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing Device 500 May Further Include a Network Interface Device 508 which May Communicate with a Network 520.

Data storage device 518 may include a computer-readable storage medium 528 on which may be stored one or more sets of instructions 525 that may include instructions for an operator, e.g., operator 145 as included in CO system 135, for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "reading," "routing," "updating," "connecting," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
identifying, at a container-orchestration system, a configuration change of a third-party resource used by a managed resource of the container-orchestration system;
reading, at the container-orchestration system and in response to identifying the change of the configuration of the third-party resource, specification data included in a dependency definition associated with the third-party resource used by the managed resource;
retrieving resource configuration data of the third-party resource based on the specification data, the resource configuration data including a first environment variable;
updating, by a processing device, status data included in the dependency definition with the resource configuration data including the first environment variable, wherein the dependency definition is associated with the managed resource and the third-party resource;
transforming the first environment variable into a second environment variable for the container-orchestration system of the managed resource; and
providing the dependency definition and the second environment variable to the managed resource of the container-orchestration system.

2. The method of claim 1, wherein the updating the dependency definition further comprises:
translating the resource configuration data into container-orchestration objects associated with the managed resource and the third-party resource, wherein the container-orchestration objects are readable by one or more managed resources of the container-orchestration system.

3. The method of claim 2, wherein the container-orchestration objects comprise configuration data describing the third-party resource and an application programming interface (API).

4. The method of claim 2, wherein the providing of at least a portion of the dependency definition to the managed resource comprises:
generating a configuration file associated with the managed resource, wherein the configuration file comprises the container-orchestration objects.

5. The method of claim 1, further comprising deploying at least one container comprising the dependency definition associated with connecting to the third-party resource.

6. The method of claim 1, wherein the providing at least a portion of the dependency definition to a managed resource causes the managed resource to mount one or more volumes associated with the third-party resource.

7. The method of claim 1, wherein identifying the configuration change of the third-party resources is based on receiving a notification of a configuration change of the third-party resource.

8. The method of claim 1, further comprising connecting to the third-party resource on a system external to the container-orchestration system based on the dependency definition.

9. A system, comprising:
a memory; and
a processing device, operatively coupled to the memory, to:
identify, at a container-orchestration system, a configuration change of a third-party resource used by a managed resource of the container-orchestration system;
read, in response to identification of the configuration change, specification data included in a dependency definition associated with the third-party resource used by the managed resource;
retrieve resource configuration data of the third-party resource based on the specification data, the resource configuration data including a first environment variable;
update status data included in the dependency definition with the resource configuration data including the first environment variable, wherein the dependency definition is associated with the managed resource and the third-party resource;
transform the first environment variable into a second environment variable for the container-orchestration system of the managed resource; and
provide the dependency definition and the second environment variable to the managed resource.

10. The system of claim 9, wherein to update the dependency definition, the processing device is further to:
translate the resource configuration data into container-orchestration objects associated with the managed resource and the third-party resource, wherein the container-orchestration objects are readable by one or more managed resources of the container-orchestration system.

11. The system of claim 10, wherein the container-orchestration objects comprise configuration data describing the third-party resource and an application programming interface (API).

12. The system of claim 10, wherein to provide at least a portion of the dependency definition to the managed resource, the processing device is further to:
generate a configuration file associated with the managed resource, wherein the configuration file comprises the container-orchestration objects.

13. The system of claim 9, wherein the processing device is further to deploy at least one container comprising the dependency definition associated with connecting to the third-party resource.

14. The system of claim 9, wherein the processing device is further to provide at least a portion of the dependency definition to a managed resource causes the managed resource to mount one or more volumes associated with the third-party resource.

15. The system of claim 9, wherein the processing device is further to identify the configuration change of the third-party resource based on receipt of a notification of the configuration change of the third-party resource.

16. The system of claim 9, wherein the processing device is further to connect to the third-party resource on a system external to the container-orchestration system based on the dependency definition.

17. A non-transitory computer-readable storage medium including instructions that, when executed by a processing device, cause the processing device to:
identify, at a container-orchestration system, a configuration change of a third-party resource used by a managed resource of the container-orchestration system;
read, in response to identification of the configuration change, specification data included in a dependency definition associated with the third-party resource used by the managed resource;
retrieve resource configuration data of the third-party resource based on the specification data, the resource configuration data including a first environment variable;

update, by the processing device, status data included in the dependency definition with the resource configuration data including the first environment variable, wherein the dependency definition is associated with the managed resource and the third-party resource;

transform the first environment variable into a second environment variable for the container-orchestration system of the managed resource; and provide the dependency definition and the second environment variable to the managed resource.

18. The non-transitory computer-readable storage medium of claim 17, wherein the processing device is further to:

translate the resource configuration data into container-orchestration objects associated with the managed resource and the third-party resource, wherein the container-orchestration objects are readable by one or more managed resources.

19. The non-transitory computer-readable storage medium of claim 18, wherein the processing device is further to:

generate a configuration file associated with the managed resource, wherein the configuration file comprises the container-orchestration objects.

20. The non-transitory computer-readable storage medium of claim 17, wherein the processing device is further to:

deploy at least one container comprising the dependency definition associated with connecting to the third-party resource.

* * * * *